July 2, 1929.  J. C. BROWN  1,719,685
MEASURING DEVICE FOR PACKAGING MACHINES
Filed May 31, 1924  3 Sheets-Sheet 1

Inventor
Joseph C. Brown,
By H. L. Woodward
Attorney

July 2, 1929.  J. C. BROWN  1,719,685
MEASURING DEVICE FOR PACKAGING MACHINES
Filed May 31, 1924  3 Sheets-Sheet 2
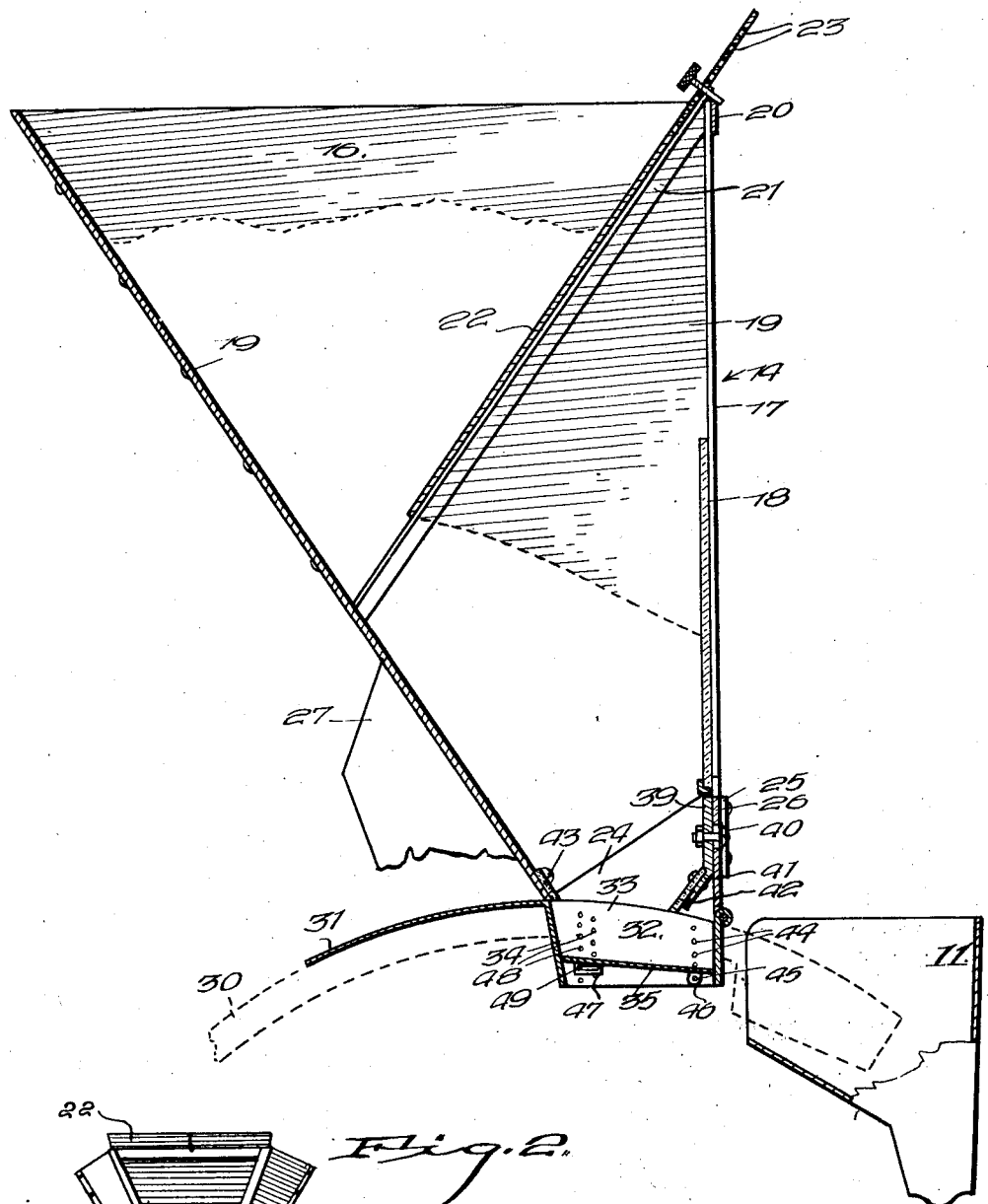
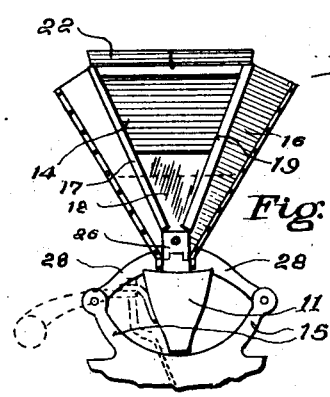
Inventor
Joseph C. Brown
By H L Woodward
Attorney

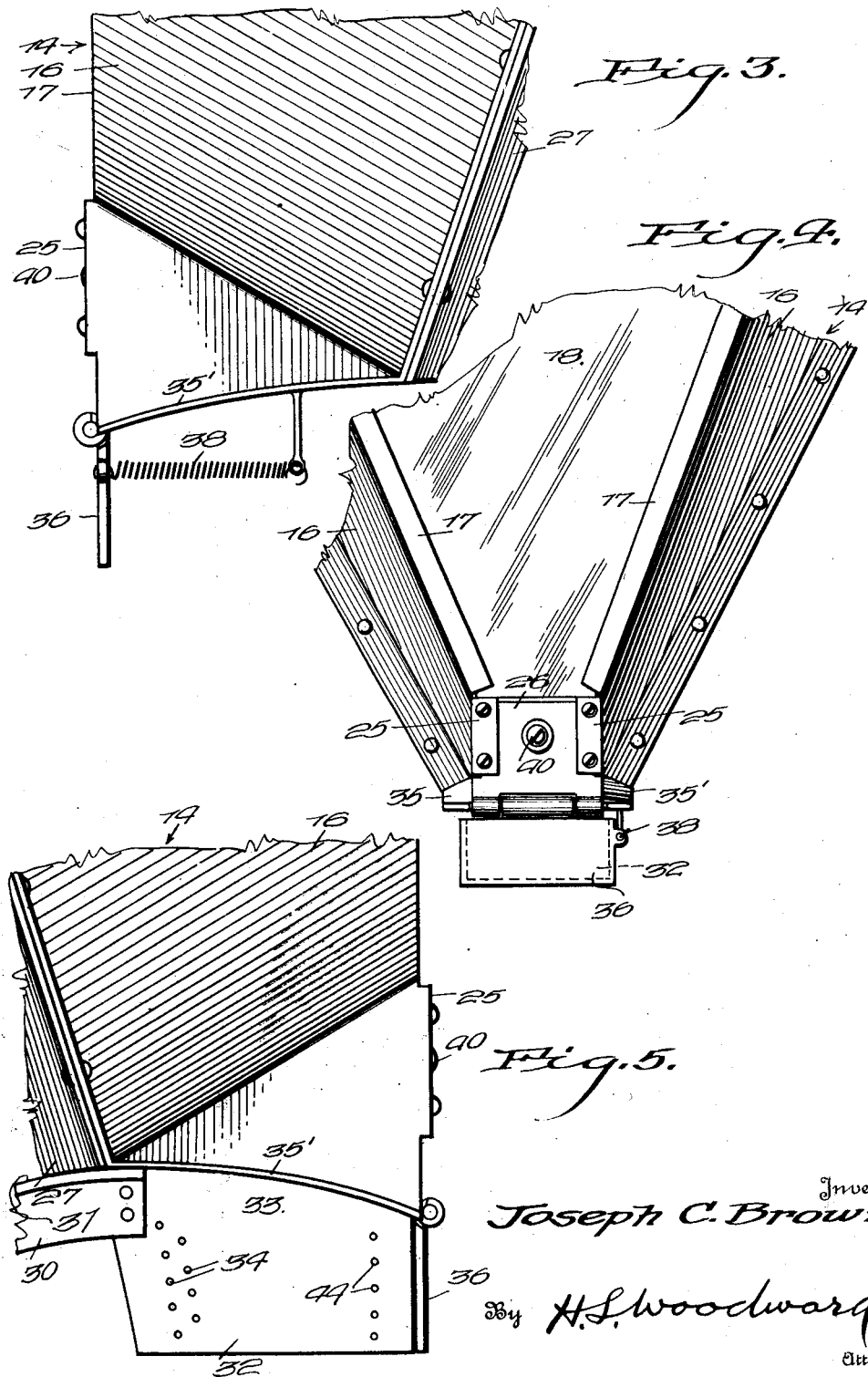

Patented July 2, 1929.

1,719,685

UNITED STATES PATENT OFFICE.

JOSEPH C. BROWN, OF FITCHBURG, MASSACHUSETTS, ASSIGNOR TO BROWN BAG FILLING MACHINE COMPANY, OF FITCHBURG, MASSACHUSETTS, A CORPORATION OF MASSACHUSETTS.

MEASURING DEVICE FOR PACKAGING MACHINES.

Application filed May 31, 1924. Serial No. 717,128.

The invention has for an object to present a specific form of measuring device adapted to operate with materials in bulk such as grass seed, peas, corn, beans and the like, with the same operating mechanism disclosed in my co-pending application Serial No. 706,968 and is in that respect a continuation of said application and objects stated therein, this apparatus being a part of the equipment available for use with the referred to machine and contemplated in the preparation of said prior application. It is an object to enable the change of the machine from a pill sampling machine of the character shown in the co-pending application to one adapted to use with bulk material by simply dismounting from the bracket arms 15 of the prior application of the parts carried thereon; and substitution of a different feeding device, in addition to detachment of the cam 12 from its operating arm and its replacement by a corresponding movable element of the present device, so that no variation in the driving and cam devices will be required for the widely different functions, the present device operating also with the same bag and funnel devices 10 and 11 before involved and shown in various prior patents, including the patent to Cummings, No. 539,171.

It is a further important aim of the invention to provide a novel measuring device cooperating with the prior funnel device in a novel way. It is also an object to effect desirable improvements in the hopper construction for appliances of this character. A further aim is to present an extremely simple construction in a measuring device adapted to function efficiently and liable in a minimum degree to damage or derangement in the uses to which it is subjected. A further aim is to offer a novel and simple measuring device adjustable readily to vary the measure of a product being packaged. It is also the purpose to present a desirable specific construction in closure elements operative with the measure as well as to enable ready production and assembly of the parts of the machine at a low cost. The invention involves also further advantages and objects, in the structural details, and in the combination and arrangements of parts, as may be more readily understood from the accompanying description and the drawings, wherein, Figure 1 is an elevational view from the left of a hopper embodying my invention, with the directly supporting parts of the machine only shown, and bag feeding and funnel devices formally indicated as being familiar elements of the machine and operative in accordance with prior practice indicated.

Figure 2 is an enlarged vertical sectional view of the hopper showing the funnel in position to receive the contents of the measure, the discharge position of the measure being indicated in dotted lines.

Figure 3 is a fragmentary elevational view of the lower part of the hopper and measure only, from the right hand side, Figure 4 is a front elevational view of the lower part of the hopper and measure.

Figure 5 is a fragmentary enlarged elevational view of the left side of the hopper parts shown in Figure 4.

Figure 8 is a similar view of the structure of Figures 1 to 5, in its relation to the same body frame of the bag filling machine.

Figure 1:
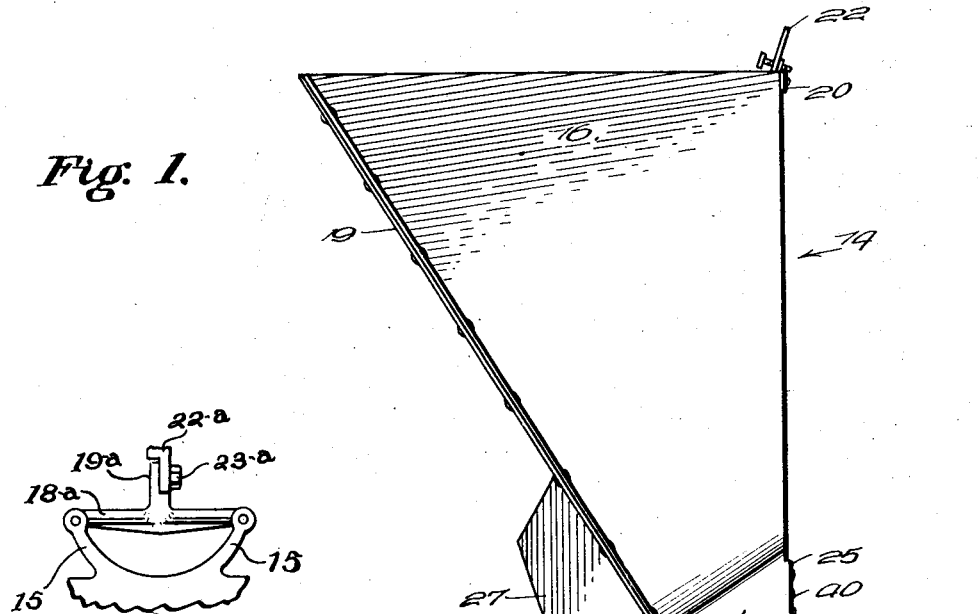

In the particular form illustrated there is shown a machine including the frame arms 15 of a bag filling machine of the type before referred to, which includes a cam operating arm 12, used in my said co-pending application to operate a cam of the same number; a bag-presenting mechanism being likewise shown formally at 10, while a funnel and bag opening is shown at 11, having the up and down movement familiar in this type of machine. The parts and mechanism referred to comprise a standard machine well known and largely used throughout the country under the name of the Brown bag filling machine. That machine is used without any change whatever, except the removal of the feeding device from two bracket arms and detachment of the operating element, as referred to. The hopper 14 comprises a receptacle formed in the main of sheet metal, but having one glass side at the front, as will be explained. The front side is vertical and located closely adjacent the path of the funnel, while the rear part and sides of the hopper extend at suitable inclinations to afford a good capacity for stock in the major part of the hopper. The side plates 16 are planiform and have integral flanges 17 formed on their front edges, turned in at a proper angle to form a retaining means for a glass plate 18 forming the front side of the hopper, which is cut to abut and fit between the plates 16 and extends only for a part of the height of the hopper, leaving an opening 19 clear thereover. It should be noted that horizontal elements of the plates 16 are also divergent from their front edges toward the rear, so that the back of the hopper is of much larger area than that between the sides at the front. The upper forward corners of the plates 16 are connected by a tie piece 20. Flanges 21 are mounted on these plates extending from the upper edge at the front downwardly and toward the the rear, intersecting the rear side 19 on a level slightly below the top of the glass 18. Slidable on the flanges 21 there is a partition plate 22, the upper forward edge of which projects beyond the hopper edge so as to be readily grasped at the front by an operator and drawn forwardly at times or pushed in to admit more or less material from the upper rear receiving part of the hopper into the lower front delivery or throat part, as found desirable. This plate is provided with a medial series of apertures 23 through any of which a pin may be inserted to engage against the front of the tie piece 20 to hold the plate 22 in adjusted positions. By reason of the divergence of the sides 16 toward the rear, and notwithstanding that the plate 22 extends downwardly into the hopper on an incline, it may be substantially rectangular in form, so that it may be drawn forwardly a considerable distance without its rear or lower edge falling between the flanges 21. It should also be noted that much of the lower parts of these flanges are located to the rear of a vertical projection of the rear side of the outlet or discharge opening at the bottom of the hopper throat.

The flanges 17 stop short a distance above the lower end of the plates 16, and the lower parts of the plates are bent apart to lie in parallel relation in vertical planes, the bend being on a line extending diagonally downwardly and to the rear, so that the plates at the front and rear on this line are the same distance apart, a hopper throat of rectangular form in horizontal section being thus formed. The flanges 25 on the lower parallel parts of the plates 16 corresponding to the flanges 17 are utilized to mount a rectangular front plate 26, by which the sides of the throat are connected and stiffened at the front, and the forward side of the throat closed. Upon the back 19 of the hopper there is secured a casting 27, having downwardly divergent lateral arms 28 the ends of which are bolted to the upper ends of the frame arms 15 before mentioned, and by this means the hopper is supported. The lower edges of the sides of the throat 24 are curved concentrically with the axis of movement of the arm 12, and mounted on this arm at its extremity there is a concentrically arcuate bar 30, disposed in a plane closely adjacent the left side of the throat 24 of the hopper. Upon its upper side there is mounted an arcuate plate 31 which during the forward movement of the bar will lie closely adjacent the lower edges of the throat opening and close the same, the plate 31 being of a length to maintain the hopper closed while the plate is at the forward limit of its movement, and to just clear the opening in the hopper when at the rear limit of its movement. Fixed upon the right hand side of the bar 30 there is a measure 32, somewhat resembling a scoop, including parallel vertical sides 33, adapted to lie adjacent respective sides of the throat 24, the measure including also a back 34, joined to its sides and an adjustable bottom 35, having an open front. The upper edges of the sides and the back 34 are alined with the projection of the curve of the plate 31. The measure is preferably wider than the throat, and if desired, flanges 35' alined with the lower edge of the throat, may be secured or formed on the plates 16 to completely close the measure when in position under the hopper.

A door 36 is hinged at the forward side of the throat, so as to extend below the hopper, and abut snugly against the forward sides of the measure 32 when the latter is in receiving position beneath the hopper for receiving the stock to be measured. This door may be hinged upon the plate 26 or upon a separate assembly plate attached to the front of the throat or any approved mounting suitable for the purpose employed. As illustrated, however, the lower part of the plate 26 is formed with knuckles at each side receiving a pintle therethrough while the door itself is formed with a single central knuckle fitted between those on the plate 26 and also receiving the pintle. The sides of the door are extended beneath the knuckles of the plate 26 in close relation so as to form a snug closure thereat. The door is held in closed position by means of a tension spring 38, connected between a suitable anchorage on the hopper and the edge portion of the door 36, as shown in Figure 3. The door may be wider than the hopper and the measure, and may be pivoted slightly above the lower edge portion of the sides of the hopper throat. For this arrangement there is shown an auxiliary plate 39, held adjustably upon the plate 26 by means of a screw 40 engaged through a slot in the plate 26. The lower part of the plate 39 may be bent slightly toward the rear, as shown at 41, and a felt wiper 42 may be secured upon the inner side of this inclined part, so as to brush slightly upon the curved plate 31 when the latter moves forwardly, preventing casual spilling of fine seed. A similar felt 43 may be secured upon the rear side of the hopper so as to brush the plate 31 in a similar manner. These felts are secured preferably at their upper edges so as to have a loose movement when the plate 31 is moving inwardly past the felt, after the manner of a flap valve, and they will be more firmly supported under outward movement of the plate 31. In case of very fine seed it may be desirable to adjust the plate 39 at a lower level than is required when coarse grain is being measured. The bottom 35 of the measure is adjustable by the provision of a series of vertically spaced openings 44 formed in the sides 33 at the forward part adapted to receive a pin 45 inserted through ears 46 formed on the bottom 35; and at the rear part of the bottom 35 ears 47 are formed having longitudinal slots therein closely adjacent the bottom and staggered series of apertures 48 are formed in the sides of the measure alined with respective adjacent ends of the slots in the ears 47 and a second supporting pin 49 is removably engaged through the openings 48 alined with the slot 47. By adjusting the rear end of the bottom 35 only, and by reason of the gradual progression of the staggered openings 48 a fine adjustment of the measure to the requirements is made possible.

In the operation of this device, the movement of the arm 12 is timed so that the measure is thrust forwardly immediately after the funnel 11 arrives at the position shown in Figure 2 (at which time a bag will have been opened and the funnel engaged therein). As the device operates, the rapid forward movement of the measure will lift the door 36, and for the time the measure is open at the front. The contents of the measure will not escape, however, owing to the period required for its inertia to be overcome by gravity and the measure will have passed into the funnel before any is spilled. Its continued movement will then cause the charge to be thrown forwardly and downwardly into the funnel, by which the charge will be guided into the bag, as will be readily understood.

The hopper part above and to the rear of the plate 22 may be termed a receiving hopper, while the part before and below the plate 22 may be called the discharge hopper in accordance with their functions.

The height of the stock in the hopper immediately over the throat will have a very material effect upon the manner in which the stock moves and distributes itself in the measure. Thus, large and irregular grains, such as corn are of what may be termed quite low fluidity. That is to say, they do not tend to flow readily, and a larger quantity may be retained in the hopper over the throat to cause proper movement into the measure and distribution therein. On the other hand, grain such as millet and some other materials which may be packaged in this device have a high degree of fluidity, and with the device adjusted in a manner suitable for corn, when the measure is returned from discharge position, the stock will drop thereinto and rise close around the door 36 where a small quantity might escape on each operation. By the use of the adjustable plate 22, therefore, the height of seeds over the throat may be limited as most advantageous and the tendency of the stock to flow after filling the measure controlled to a large extent, and also, by the use of the plate 39 the fine materials of greater fluidity may be prevented from packing around the upper part of the door 36, so that none will be spilled before or when the measure is projected forwardly. With the plate 22 near the lower limit of its movement, the movement of the stock from the rear portion of the hopper will have a relatively large horizontal component, while with the plate 22 raised the resultant movement of stock will have an increased vertical component and the horizontal component will be relatively smaller: Consequently the influence of gravity will effect movement of a larger body of stock in the last mentioned position of the plate 22 than in its first mentioned position, and it will be deeper over the throat.

It is an advantage of this hopper construction that—the discharge hopper being clear of moving or obstructing parts—the operator may insert the hand through the opening 19 for removal of any foreign material that may interfere with the proper movement of the stock, or to loosen up the stock itself in case the nature of the material may require it. At the same time, a hopper of considerable capacity may be provided while still retaining the advantage of manual access to the stock immediately adjacent the discharge point of the hopper.

A further important advantage attained in this machine is that it may be operated more rapidly for the introduction of given charges of stock into envelops and the like. That is to say, the time between the movement of opening of the bag and disengagement of the funnel may be materially shortened, by reason of the fact that it is not necessary to allow time for gravity to overcome the inertia of the charge, but only a fraction of such time by reason of the propulsive action of the measure here disclosed. This is a material factor in the present day trend of industrial development, where the speedier operation of machines often represents the difference between profit and loss. This action may be termed ballistic in the original sense in view of the throwing effect, which is intended to be distinct from the discharge of a measure through movement of the charge induced by gravity. There is a distinction intended also between the effect produced by a reciprocating member which (as in my device) ceases to follow the charge after imparting high momentum thereto, and a rotating device of uniform movement, which would have the effect of scattering the charge if utilization of centrifugal force were attempted. However, in rotating measures heretofore developed slow operation is involved, permitting movement of the charge principally by gravity.

Figure 7:
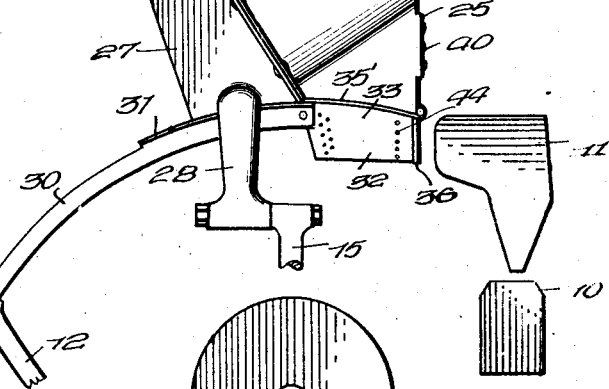
Figure 7 is a front elevation of the mounting for the device of Figure 6 on the body frame of the bag filling machine.
Figure 6:
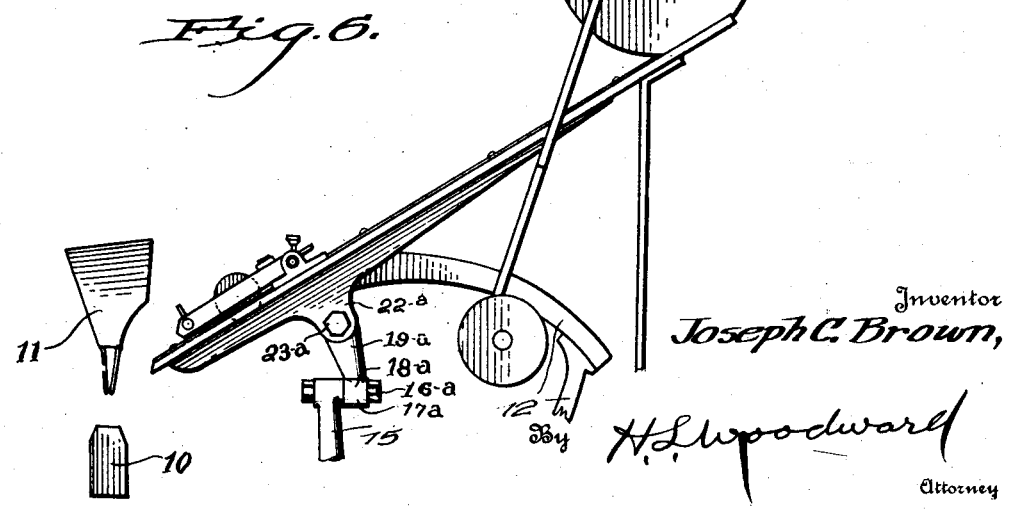
Figure 6 is a left hand view of the interchangeable device suitable for pill sampling or counting various articles.

In Figures 6 and 7 the reference characters having the index "a" thereafter indicate the same parts described in the same prior application with the use of the same numerals without the index letter. A mounting bar 18ª is shown adapted having apertured ends 17ª to aline with the upper ends of the arms 15, to which the bar may be secured by bolts 16ª. The bar has a central stud 19ª with a flattened side, to which an ear 22ª of a pill sampling device of special function may be secured pivotally by the bolt 23ª. This device, functioning as described in said prior application will deliver pills in counted charges to the funnel 11 by operation of the arm 12, utilizing the same motion as involved in the operation of the measure 32.

I claim:

1. A measure for a machine of the character described comprising two sides and a back in fixed relation, and a bottom vertically adjustable between the sides, said sides having series of alined apertures therein adjacent the back and open end; ears on the bottom, and members insertable through the ears and alined apertures, in the sides.

2. The article of claim 1 in which the openings adjacent one end of the measure comprise a staggered series, whereby closer spacing may be attained.

3. In a packaging machine, a receiving hopper, a discharge hopper having a discharge opening and arranged and adapted to contain at all times a body of stock the mass of which lies immediately at and over said opening, said receiving hopper having delivering communication with the discharge hopper at one side of the discharge hopper, the discharge hopper having a side of low altitude and being clear to permit insertion of the hand of an operator for manual access to the discharge opening and stock in the discharge hopper at all times.

In testimony whereof I affix my signature.

JOSEPH C. BROWN.